Figure 1:
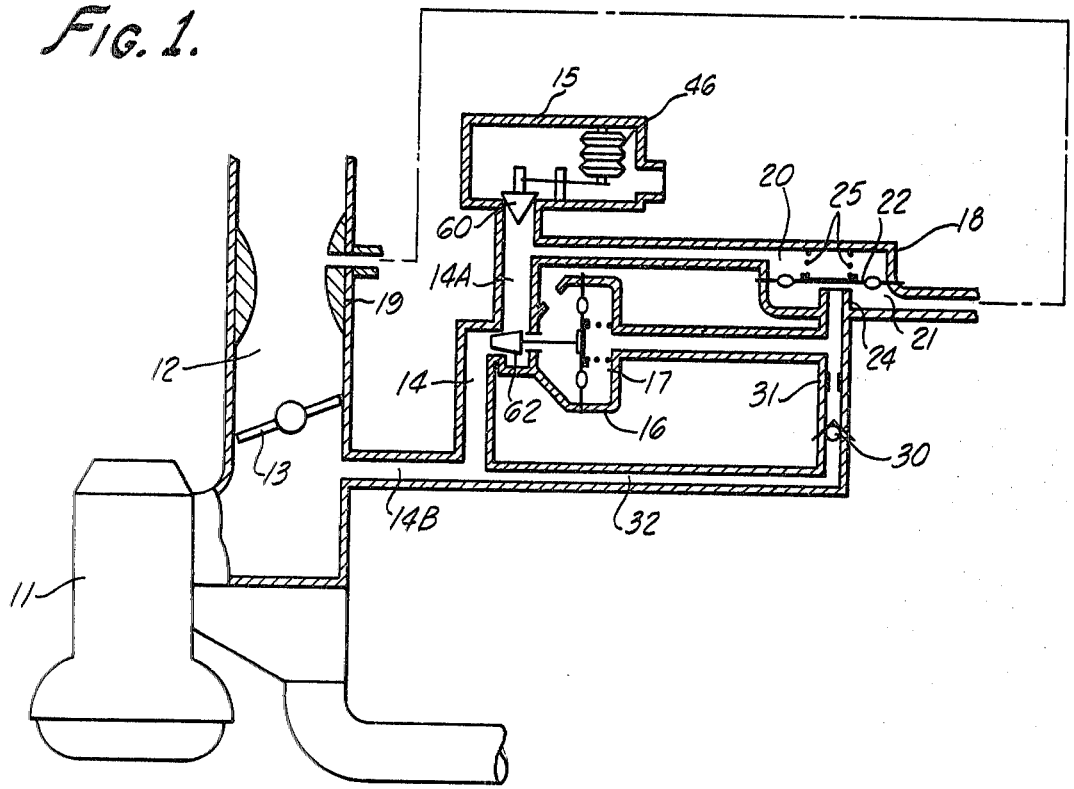

United States Patent [19]

Nishimura

[11] 4,249,505
[45] Feb. 10, 1981

[54] COMPENSATION SYSTEM FOR QUANTITY OF INTAKE AIR FOR AN INTERNAL COMBUSTION ENGINE

[75] Inventor: Hiroyuki Nishimura, Kounosu, Japan

[73] Assignee: Honda Giken Kogyo Kabushiki Kaisha, Tokyo, Japan

[21] Appl. No.: 43,212

[22] Filed: May 29, 1979

[30] Foreign Application Priority Data

Jun. 12, 1978 [JP] Japan ................. 53-69858

[51] Int. Cl.³ ............................. F02M 23/08
[52] U.S. Cl. .................... 123/587; 123/585
[58] Field of Search ......... 123/119 D, 124 R, 124 B, 123/119 EC, 119 A

[56] References Cited

U.S. PATENT DOCUMENTS

| | | | |
|---|---|---|---|
| 3,739,797 | 6/1973 | Caldwell | 123/119 A X |
| 3,779,222 | 12/1973 | Lorenz | 123/119 A |
| 3,818,880 | 6/1974 | Dawson et al. | 123/119 A |
| 3,884,200 | 5/1975 | Caldwell | 123/119 A |
| 3,915,136 | 10/1975 | Caldwell | 123/119 A |
| 3,970,061 | 7/1976 | Caldwell | 123/119 A |
| 4,033,308 | 7/1977 | Hayashi et al. | 123/119 A |
| 4,091,783 | 5/1978 | Laprade et al. | 123/119 D X |
| 4,102,313 | 7/1978 | Laprade et al. | 123/119 D X |
| 4,148,848 | 4/1979 | Ogita | 123/119 D X |
| 4,153,652 | 5/1979 | Ogita | 123/119 D X |

FOREIGN PATENT DOCUMENTS 1486093  9/1977  United Kingdom .
1486651  9/1977  United Kingdom .

*Primary Examiner*—Tony M. Argenbright
*Attorney, Agent, or Firm*—Lyon & Lyon

[57] ABSTRACT

A system for controlling the quantity of intake air for an internal combustion engine in response to changes in air density employs a supplementary air intake passage connecting the main air intake passage on the downstream side of the carburetor throttle valve with the atmosphere. An atmospheric pressure compensation valve controls the open cross-sectional area of the supplementary air passage in response to changes in atmospheric pressure. In addition, a vacuum responsive control valve controls the open cross-sectional area of the supplementary air intake passage to pass an amount of air through the supplementary passage proportional to the amount of air passed through the main air intake passage.

5 Claims, 2 Drawing Figures

COMPENSATION SYSTEM FOR QUANTITY OF INTAKE AIR FOR AN INTERNAL COMBUSTION ENGINE

BACKGROUND

This invention relates to correction systems for controlling the quantity of intake air to an internal combustion engine in response to changes in atmospheric conditions.

For internal combustion engines, if the density of atmospheric air changes due to changes in weather conditions or changes in altitude, the air-fuel ratio introduced to the engine changes. This can result in deterioration of the performance of the engine and an increase in the level of pollutants in the engine exhaust gas, particularly when a vehicle is operated at high altitude. Because of this problem, various correction systems to adjust the volume of intake air for an engine in response to changes in operating altitude have been devised.

The devices and systems that have been developed generally fall into two categories. The first category comprises systems that vary the amount of fuel supplied to the engine. The second category comprises systems that vary the amount of a secondary air stream that is introduced to the engine. The first type of system has been found to have some disadvantages, including disruption of the operation of emission control systems dependent upon the amount of opening of the throttle valve.

In the second type of system, there is a prior art device that provides a by-pass in the venturi section of the air intake passage. The open cross-sectional area of the by-pass passage is varied in accordance with changes in atmospheric pressure.

SUMMARY

The present invention is directed to a system for providing air to an internal combustion engine, where the system compensates for changes in air density due to changes in atmospheric pressure such as changes resulting from operation at high altitude. The system supplies secondary air to the downstream side of the throttle valve of an engine. The amount of secondary air provided changes in proportion to both the amount of intake mixture flowing through the throttle valve and changes in air density. For a fixed amount of intake mixture, the amount of secondary air varies substantially only with changes in air density. For constant air density, the amount of secondary air varies substantially only with changes in the amount of intake mixture.

The system comprises a supplementary air intake passage connecting the main air intake passage of the engine with the atmosphere. The connection is made on the downstream side of the throttle valve. Atmospheric pressure correction means are provided in the supplementary air intake passage for controlling the open cross-sectional area of the supplementary air passage in response to changes in atmospheric pressure. Means are also provided for controlling the open cross-sectional area of the supplementary air intake passage so as to pass an amount of air through the supplementary air intake passage proportional to the amount of air passed through the main air intake passage.

THE DRAWINGS

Figure 2:
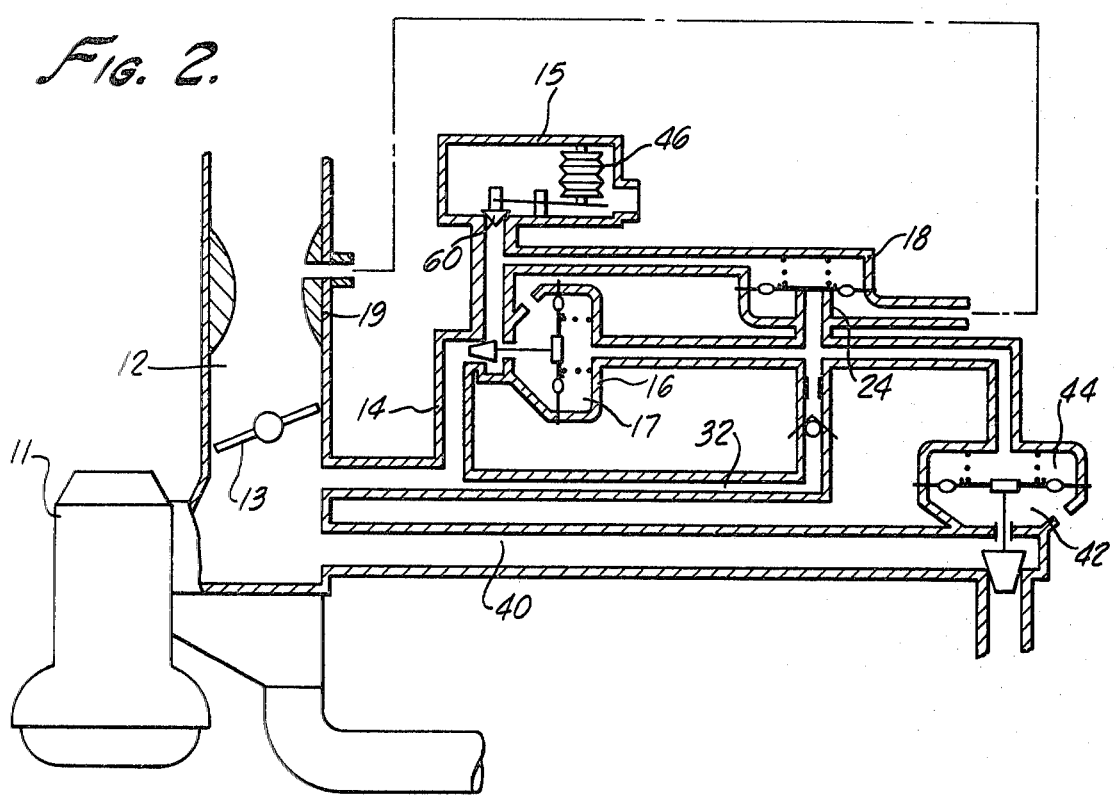

These and other features, aspects, and advantages of the present invention will become better understood with reference to the following description, appended claims, and accompanying drawings wherein:

FIG. 1 is a schematic diagram showing an internal combustion engine air intake system embodying features of the present invention; and FIG. 2 is a schematic diagram showing another embodiment of the present invention.

DESCRIPTION

With reference to FIG. 1, an internal combustion engine 11 is provided with a main air intake passage 12 having a throttle valve 13 therein. A supplementary air intake passage 14 branches off from the main air intake passage 12 on the downstream side of the throttle valve 13. The supplementary air intake passage comprises an actuation chamber section 14A and a base portion 14B. An atmospheric pressure correction valve 15 is provided at the top of the actuation chamber 14A. This valve, which includes bellows 46 and a port 60, varies the open cross-sectional area of the supplementary air passage 14 in response to changes in atmospheric pressure. As atmospheric pressure descreases, the correction valve 15 increases the open cross-sectional area of the supplementary passage 14. As atmospheric pressure increases, the valve 15 tends to decrease the open cross-sectional area of the supplementary air intake passage 14.

The supplementary air intake passage 14 is also provided with a first vacuum responsive control valve 16, which is located on the downstream side of the atmospheric pressure correction valve 15 and which separates the actuation chamber 14A from the base portion 14B. The first control valve varies the open cross-sectional area of the supplementary air intake passage 14 in response to the amount of intake air entering the engine through the main intake passage 12. This is effected by connecting the vacuum chamber 17 of the first control valve 16 through a second vacuum control valve 18 to the venturi portion 19 of the carburetor.

The second control valve 18 comprises first and second chambers separated from each other by a diaphragm 22. The first chamber 20 is connected to the actuation chamber 14A and the second chamber 21 is connected to both the venturi portion 19 of the carburetor and the vacuum chamber 17 of the first control valve 16. The second chamber 21 is provided with a port 24 that is opened or closed by the diaphragm 22. The diaphragm 22 can be provided with springs 25 for adjusting its equilibrium position relative to the port 24. The port 24, when open, permits communication between the vacuum chamber 17 of the first control valve and the venturi portion 19 of the carburetor. When the port 24 is closed by the diaphragm, communication between these two elements is prevented.

The vacuum chamber 17 of the first control valve is connected through a check valve 30 and a restricted orifice 31 to a passageway 32 branched off from the base 14B of the supplementary air passage. The check valve 30 and the restricted orifice 31 offset the effects of operating the throttle valve 13 in the fully opened position.

The version of the invention shown in FIG. 2 includes all the elements of the version shown in FIG. 1, and in addition, a secondary supplementary air passage 40. This second supplementary air passage 40 is also connected to the main intake passage 12 on the downstream side of the throttle valve 13. The second supplementary air passage 40 is provided with a third vacuum responsive control valve 42. The vacuum chamber 44 of the third control valve 42 is connected to both the port 24 of the second control valve 18 and the vacuum chamber 17 of the first control valve 16. The vacuum in the vacuum chamber 44 of the third control valve is responsive to the vacuum in the vacuum chamber 17 of the first control valve 16. This serves to stabilize the operation of the variable port 60 in the atmospheric pressure correction valve 15 which is made small compared to that of FIG. 1.

The method by which the apparatus shown in FIGS. 1 and 2 serves to control the quantity of intake air in response to variations in atmospheric pressure is as follows. When the opening of the throttle valve 13 is small, the vacuum PB in the main air intake passage 12 on the downstream side of the throttle valve 13 becomes large. Because the vacuum chamber 17 of the first control valve 16 is connected via passage 32 to the main intake passage 12 on the downstream side of the throttle valve 13, the vacuum Pe in the vacuum chamber 17 also becomes large. This opens the first control valve 16, thereby making the vacuum P in the actuation chamber 14A larger, whereby the diaphragm 22 of the second control valve 18 opens the connecting port 24 between the venturi 19 and the vacuum chamber 17 of the first control valve 16. This causes the vacuum Pe in the vacuum chamber 17 of the first control valve 16 to drop because of the low vacuum Pv in the venturi 19. In response to this, the first control valve 16 immediately closes.

Thus, the vacuum P in the actuation chamber 14A is controlled by a feedback system to be closed to the vacuum Pv in the venturi 19.

The apparatus of FIGS. 1 and 2 is capable of supplying secondary air through the supplemental passage 14 in proportion to the amount of intake mixture flowing through the throttle valve 13, as well as changing the proportional amount of secondary air in accordance with changes in atmospheric pressure. This will become clearer from the following analysis.

For an atmospheric pressure of Po, a cross-sectional area of the venturi 19 of A, a cross-sectional area of the opening of the throttle valve section of the main air intake passage 12 of $Z_1$, the flow rate $W_1$ in the main intake passage 12 through the venturi section (i) and through the throttle valve section (ii) are, respectively:

$$W_1 = CvA \sqrt{ 2g \frac{k}{k-1} \cdot Po\, \rho o \left( (\frac{Pv}{Po})^{\frac{2}{k}} - (\frac{Pv}{Po})^{\frac{k+1}{k}} \right) } \quad \text{(i)}$$

$$W_1 = C_1 Z_1 \sqrt{ 2g \frac{k}{k-1} \cdot Pv\, \rho v \left( (\frac{PB}{Pv})^{\frac{2}{k}} - (\frac{PB}{Pv})^{\frac{k+1}{k}} \right) } \quad \text{(ii)}$$

where g is acceleration of gravity; k is specific heat ratio; $\rho o$, $\rho v$ are air density; Cv is the flow coefficient through the venturi section; and $C_1$ is the flow coefficient through the throttle valve section.

The flow rate $W_2$ through the valve port 60 of the atmospheric pressure correction valve is:

$$W_2 = C_3 Z_3 \sqrt{ 2g \frac{k}{k-1} \cdot Po\, \rho o \left( (\frac{P}{Po})^{\frac{2}{k}} - (\frac{P}{Po})^{\frac{k+1}{k}} \right) } \quad \text{(iii)}$$

where $Z_3$ is the valve port cross-sectional flow area of the atmospheric pressure correction valve 15 and $C_3$ is the flow coefficient through the valve port 60 of the atmospheric pressure control valve 15.

The flow rate $W_2$ through the valve port 62 of the first control valve 16 is:

$$W_2 = C_2 Z_2 \sqrt{ 2g \frac{k}{k-1} \cdot P\, \rho v \left( (\frac{PB}{P})^{\frac{2}{k}} - (\frac{PB}{P})^{\frac{k+1}{k}} \right) } \quad \text{(iv)}$$

where $C_2$ is the flow coefficient through the valve port 62 of the first control valve 16 and $Z_2$ is the cross-sectional flow area through the valve port 62.

As noted before, the pressure P in the actuation chamber 14A is controlled at all times so that it is substantially equal to the pressure Pv in the venturi section 9 of the carburetor. Thus, when that P=Pv:

From (i) and (iii) $\frac{W_2}{W_1} = \frac{C_3 Z_3}{CvA}$ (a)

From (ii) and (iv) $\frac{W_2}{W_1} = \frac{C_2 Z_2}{C_1 Z_1}$ (b)

It has been learned that the flow coefficients Cv $C_1$, $C_2$ and $C_3$ are substantially constant, although small changes can occur. Assuming that these flow coefficients are substantially constant, then from equation (a), for a fixed $Z_3$ the flow ratio $W_2/W_1$ is fixed regardless of the values of PB, Pv and Po and regardless of the size of the throttle valve opening $Z_1$. Furthermore, since the atmospheric pressure correction valve 15 changes $Z_3$ in accordance with changes in the atmospheric pressure Po, the flow ratio $W_2/W_1$ automatically changes in accordance with changes in the atmospheric pressure Po.

From equation (a), it is apparent that at a fixed atmospheric pressure Po, $Z_3$ remains fixed and thus the flow ratio $W_2/W_1$ remains stable. Therefore, from equation (b), the open area $Z_2$ of the port 62 of the first control valve 16 is feed back controlled so that at all times it is maintained at a substantially constant ratio to the open area $Z_1$ of the throttle valve 13. Because of this, the operating vacuum Pe in the vacuum chamber 17 of the first control valve 16 can be used as the output to operate the third vacuum control valve 42. Thus, the flow of air passing through the second supplementary air passage 40 can be proportional to $W_1$, if the third control valve 42 shown in FIG. 2 has similar flow rate characteristics to the first vacuum control valve 16. Preferably the flow rate characteristics of the third control valve 42 vary in accordance with changes in $W_1$.

In summary, the present invention provides a system for controlling the intake air to an engine in response to changes in atmospheric conditions. According to the present invention, the vacuum P in an actuation chamber 14A in a first supplementary air passage 14 is feedback-controlled to a value close to the vacuum Pv in the venturi section 19 of the carburetor. In order to maintain a stable ratio between the rate of air flow $W_2$ in the first supplementary air intake passage and the flow rate $W_1$ through the main intake air passage 12, the open area $Z_3$ at the inlet of the first supplementary air passage 14 is controlled in accordance with changes in the atmospheric pressure. This changes the ratio of $W_2/W_1$ in accordance with changes in the atmospheric pressure. Furthermore, this arrangement is capable of supplying secondary air to an engine in proportion to the amount of the intake mixture flowing through the throttle valve, while changing the proportional amount of the secondary air in accordance with the atmospheric pressure.

Although the present invention has been described in considerable detail with reference to certain versions thereof, other versions are possible. Therefore, the spirit and scope of the appended claims should not necessary be limited to the description of the preferred versions contained herein.

What is claimed is:

1. Apparatus for controlling the quantity of intake air for an internal combustion engine comprising:
    (a) a main air intake passage equipped with a carburetor having a throttle valve;
    (b) a supplementary air intake passage connecting the main air intake passage on the downstream side of the throttle valve with the atmosphere;
    (c) atmospheric pressure correction means in the supplementary air intake passage for varying the open cross-sectional area of the supplementary air passage in response to changes in atmospheric pressure; and
    (d) means for controlling the open cross-sectional area of the supplementary air intake passage so as to pass an amount of air through the supplementary air intake passage proportional to the amount of air passed through the main air intake passage.

2. The apparatus of claim 1 in which the means for controlling the open cross-sectional area of the supplementary air intake passage comprises a first vacuum responsive control valve in the supplementary air intake passage.

3. The apparatus of claim 2 wherein the first vacuum control valve comprises a vacuum chamber which is connected by a connecting passage to the main air intake passage, and the means for controlling the open cross-sectional area of the supplementary air intake passage includes a second vacuum responsive control in the connecting passage for controlling the vacuum in the vacuum chamber of the first control valve in proportion to the amount of air passed through the main air intake passage.

4. The apparatus of claim 3 wherein the second vacuum control valve comprises first and second vacuum chambers separated from each other by a diaphragm, wherein the first vacuum chamber is connected to the supplementary air intake passage on the upstream side of the first control valve and the second vacuum chamber is connected both to the venturi of the carburetor and the vacuum chamber of the first control valve, wherein the connection between the second vacuum chamber and the vacuum chamber of the first control valve is capable of being opened and closed by the diaphragm.

5. The apparatus of claim 4 wherein the main air intake passage is provided, on the downstream side of the throttle valve, with a second supplementary air intake passage, the second supplementary air intake passage being equipped with a third vacuum responsive control valve, the chamber of the third control valve being connected to the vacuum chamber of the first control valve.

* * * * *

UNITED STATES PATENT AND TRADEMARK OFFICE
CERTIFICATE OF CORRECTION

PATENT NO. : 4,249,505
DATED : February 10, 1981
INVENTOR(S) : Hiroyuke Nishimura It is certified that error appears in the above-identified patent and that said Letters Patent are hereby corrected as shown below:

Column 2, lines 3-5 should read as follows:

--FIG. 1 is a schematic diagram showing a preferred embodiment of an internal combustion engine air intake system embodying the present invention; and--

Signed and Sealed this

Twelfth Day of May 1981

[SEAL]

Attest:

RENE D. TEGTMEYER

Attesting Officer

Acting Commissioner of Patents and Trademarks